(12) United States Patent
Tanaka et al.

(10) Patent No.: US 11,465,436 B2
(45) Date of Patent: Oct. 11, 2022

(54) POSITION INDICATOR

(71) Applicant: Wacom Co., Ltd., Saitama (JP)

(72) Inventors: Kohei Tanaka, Saitama (JP); Kenichi Ninomiya, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/343,551

(22) Filed: Jun. 9, 2021

(65) Prior Publication Data

US 2021/0291580 A1 Sep. 23, 2021

Related U.S. Application Data

(63) Continuation of application No. PCT/JP2019/043874, filed on Nov. 8, 2019.

(30) Foreign Application Priority Data

Jan. 7, 2019 (JP) .............................. JP2019-000568

(51) Int. Cl.
*B43K 29/08* (2006.01)
*B43K 7/00* (2006.01)
*G06F 3/0354* (2013.01)

(52) U.S. Cl.
CPC .............. *B43K 29/08* (2013.01); *B43K 7/005* (2013.01); *G06F 3/03545* (2013.01)

(58) Field of Classification Search
CPC ........ B43K 29/08; B43K 5/005; B43K 7/005; B43K 8/003; B43K 21/006; B43K 29/00; B43K 29/087; B43K 27/02; G06F 3/03545; G06F 3/03546; G06F 3/0354; G06F 3/0346

USPC ........................................ 401/195, 258–260
See application file for complete search history.

(56) References Cited

U.S. PATENT DOCUMENTS

| 6,204,457 | B1 | 3/2001 | Shekhel et al. |
| 6,627,870 | B1* | 9/2003 | Lapstun .............. H04N 1/32771 |
| | | | 250/221 |
| 9,910,514 | B2* | 3/2018 | Mihai ................. G06F 3/03545 |
| 2017/0308185 | A1 | 10/2017 | Eguchi |

(Continued)

FOREIGN PATENT DOCUMENTS

| JP | 2018-97458 A | 6/2018 |
| WO | 2017/134917 A1 | 8/2017 |

OTHER PUBLICATIONS

International Search Report, dated Dec. 24, 2019, for International Application No. PCT/JP2019/043874, 3 pages, (with English Translation).

(Continued)

*Primary Examiner* — David J Walczak
(74) *Attorney, Agent, or Firm* — Seed IP Law Group LLP

(57) ABSTRACT

A position indicator that enables a component having a writing function to be easily replaced. The component having the writing function can be inserted/extracted into/from a first housing through a second opening of the first housing. When the second opening of the first housing and a third opening of a second housing are engaged in a state in which the component having the writing function has been inserted into the first housing, a resonant circuit is formed that includes a circuit in which a coil inside the first housing and a writing pressure detector inside the second housing are electrically connected to each other.

13 Claims, 8 Drawing Sheets

(56) References Cited

U.S. PATENT DOCUMENTS

2017/0361639 A1   12/2017  Kaneda et al.
2018/0164908 A1    6/2018  Tanaka et al.
2018/0314351 A1   11/2018  Kaneda et al.

OTHER PUBLICATIONS

Extended European Search Report, dated Jan. 20, 2022, for European Application No. 19909424,4- 1216 (8 pages).

* cited by examiner

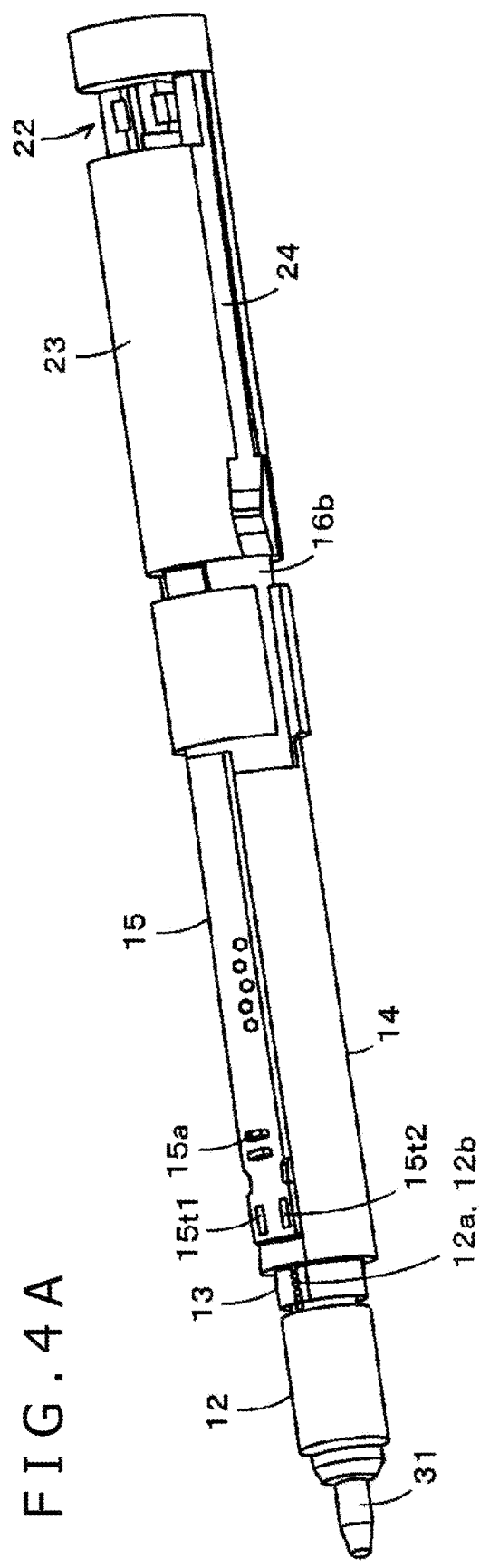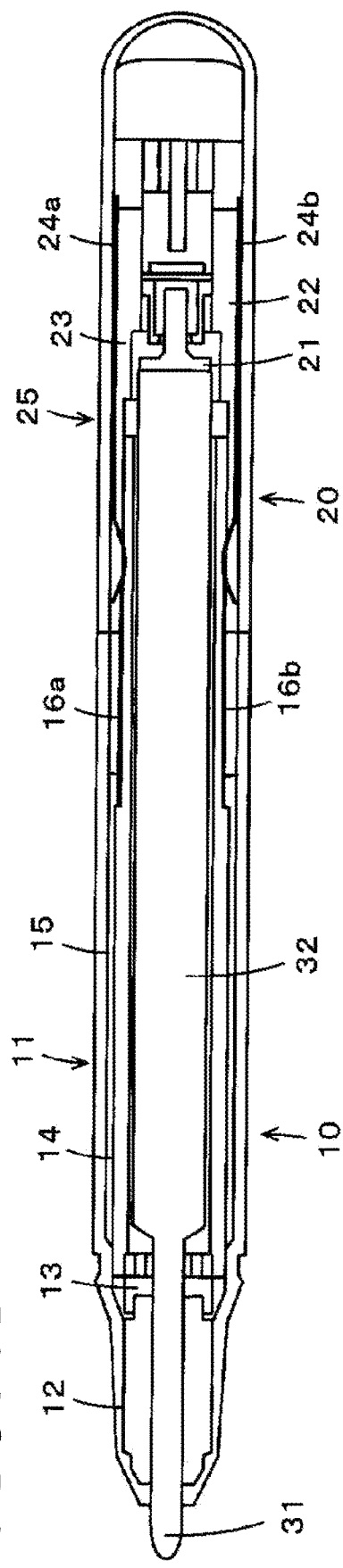
FIG. 4A
FIG. 4B

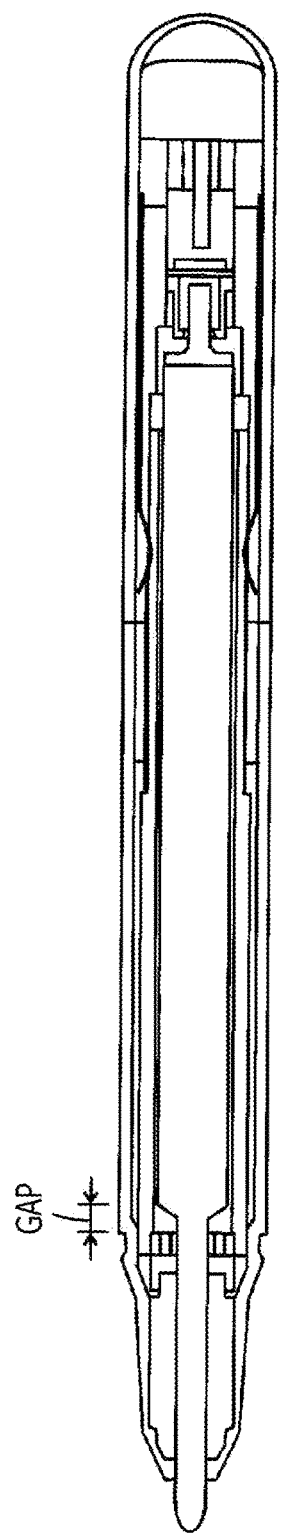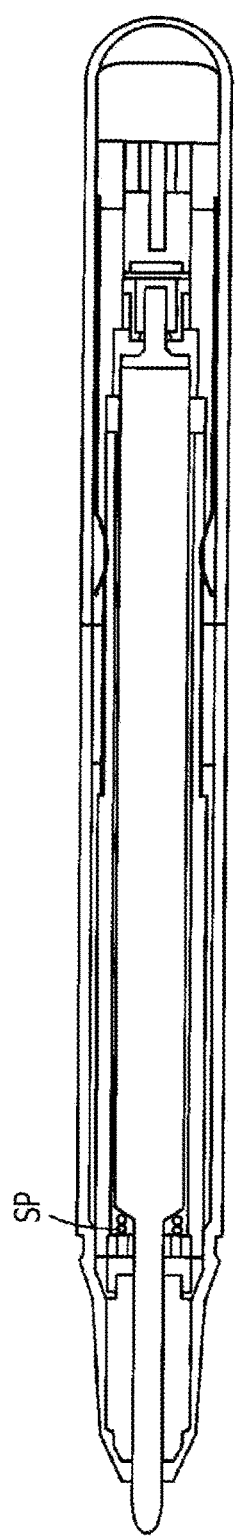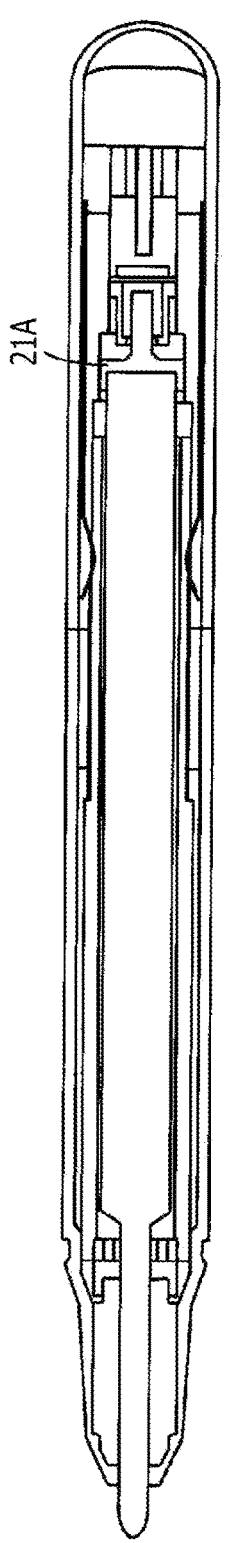

POSITION INDICATOR

BACKGROUND

Technical Field

The present disclosure relates to a position indicator having a position indicating function for a position detecting device and also having a writing function for writing information on a paper medium, for example.

Background Art

For example, as one of input devices for various kinds of electronic equipment such as a high-performance telephone terminal called a smartphone and a tablet PC (Personal Computer), there is a device including a position detecting device and a position indicator generally called an electronic pen. As one of methods of the position detecting device and the position indicator, there is an electromagnetic induction method (EMR (Electro Magnetic Resonance technology) method).

The position detecting device adopting the electromagnetic induction method has a sensor unit in which a plurality of loop coils are arranged in each of the X-axis direction and the Y-axis direction. A transmission period in which power is sequentially supplied to a plurality of loop coils of the sensor unit to generate magnetic fields and a reception period in which the power supply is stopped and magnetic fields from an outside are received are alternately provided.

On the other hand, the position indicator that adopts the electromagnetic induction method has a resonance circuit including a coil and a capacitor. The position indicator generates a signal by a current flowing through the coil according to a magnetic field from the sensor unit of the position detecting device. The position indicator transmits a signal including writing pressure information to the position detecting device. Then, the position detecting device receives the signal transmitted from the position indicator during the reception period, and detects an indicated position and a writing pressure by the electronic pen.

As a position indicator that adopts the electromagnetic induction method, a position indicator having a position indicating function for a position detecting device and also having a writing function for writing information on a paper medium, for example, is known. As an example, Patent Document 1 discloses a technique relating to an electromagnetic induction type electronic pen also having a function for recording on a paper medium or the like. As illustrated in FIG. 5 of Patent Document 1, this electronic pen is a type in which a module composed of an ink writing unit, a coil unit, a circuit board, a writing pressure detector, and the like is placed into a housing through an opening located at a rear end of the housing.

PRIOR ART DOCUMENT

Patent Document

Patent Document 1: WO 2017/134917 A

BRIEF SUMMARY

Technical Problem

When the ink writing unit is to be replaced because of interference with recording on a paper medium in the electronic pen disclosed in Patent Document 1, first the module composed of the ink writing unit, the coil unit, the circuit board, the writing pressure detector, and the like is taken out of the housing, and the ink writing unit is removed from the module and replaced with a new ink writing unit. Since the ink writing unit is one component that constitutes the module, it is not easy to replace the ink writing unit.

Further, as illustrated in FIG. 9A, known is a configuration in which a refill (replacement cartridge) 110 of a predetermined standard, which is a component having a writing function, is attachable and detachable through an opening located at a pen tip of a position indicator 100. In this case, unlike the replacement of the ink writing unit disclosed in Patent Document 1, the refill 110 can be easily replaced.

Incidentally, when a refill 120 having a relatively large ink tank as illustrated in FIG. 9B is used for the position indicator, not only the writing function can be maintained for a long time by a large amount of ink, but also smooth writing feeling is attained by a pressure of the large amount of ink. Therefore, there is a need to adopt the refill 120 having a relatively large ink tank as a refill that can be replaced for a position indicator.

However, for the refill 120 having a relatively large ink tank illustrated in FIG. 9B, in order to make the refill attachable to and removable from the pen tip side of the position indicator as in the case illustrated in FIG. 9A, the opening on the pen tip side of the position indicator must be enlarged. In this case, it becomes difficult to stably position the pen tip of the refill 120 in the opening on the pen tip side formed in consideration of a shape of the relatively large ink tank, which may make some influence during the writing time.

In view of the above, one object of the present disclosure is to provide a position indicator allowing a component having a writing function to be easily replaced.

Technical Solution

A position indicator according to the present disclosure includes a first housing having a first opening portion at a first end where a pen tip of a component having a writing function is located and a second opening portion at a second end for inserting and removing the component having the writing function, a coil located inside the first housing and on a side closer to the first opening portion, a second housing having a third opening portion that engages with the second opening portion, a writing pressure detector that is located inside the second housing and detects a writing pressure applied to the pen tip of the component having the writing function, and a resonance circuit including a circuit in which the coil and the writing pressure detector are electrically connected in a state where the second opening portion and the third opening portion are engaged with each other.

Advantageous Effect

According to the present disclosure, a position indicator allowing a component having a writing function to be easily replaced can be provided.

BRIEF DESCRIPTION OF DRAWINGS

FIGS. 4A and 4B are an external view excluding a case of the electronic pen according to the embodiment of the present disclosure and a cross-sectional view including the case, respectively.

FIGS. 8A to 8C are diagrams for illustrating modification examples of the electronic pen according to the embodiment of the present disclosure.

MODE FOR CARRYING OUT THE DISCLOSURE

Hereinafter, an embodiment of the electronic pen according to the disclosure will be described with reference to the drawings.

[Appearance and Schematic Configuration of Electronic Pen 1]

Figure 1A:
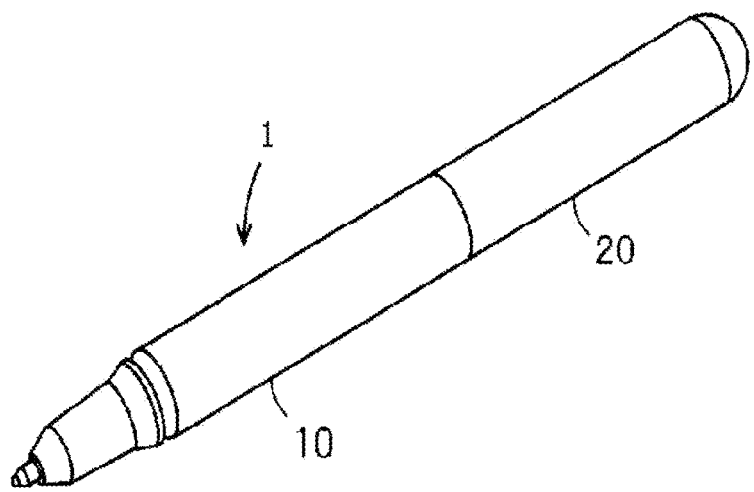
FIGS. 1A and 1B are an external view and an exploded perspective view, respectively, of an electronic pen according to an embodiment of the present disclosure.
Figure 1B:
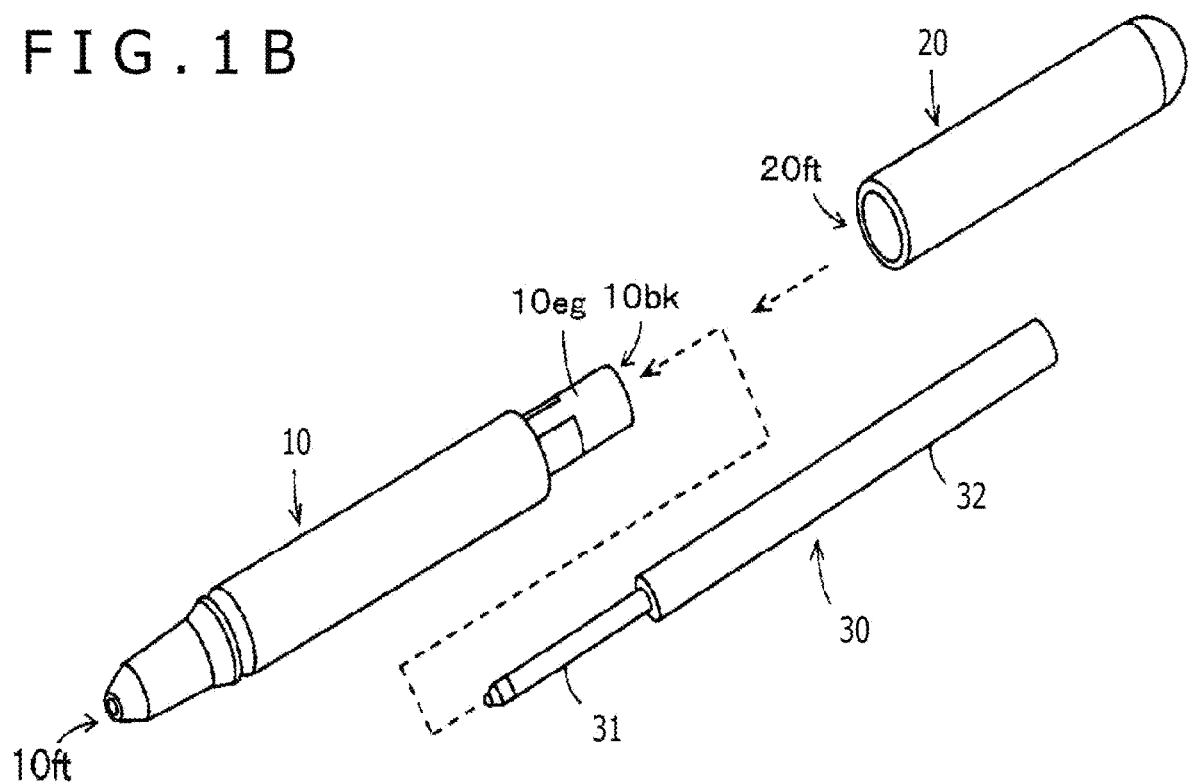

FIGS. 1A and 1B are an external view and an exploded perspective view, respectively, of an electronic pen 1. As illustrated in the external view of FIG. 1A, a housing of the electronic pen 1 has a front unit 10 and a rear unit 20. As illustrated in the exploded perspective view of FIG. 1B, the electronic pen 1 is configured such that the front unit 10 and the rear unit 20 are separable. As will be described in detail later, a configuration is established so that a refill (replacement cartridge) 30 is attachable to and detachable from the front unit 10 in a state where the front unit 10 and the rear unit 20 are separated.

The front unit 10 is in a shape of a tubular body having a tapered end on a pen tip side (front end side). An opening 10*ft* through which a core 31 of the refill 30 protrudes is provided at the end of the front unit 10 on the pen tip side. On the other hand, an opening 10*bk* serving as an insertion/extraction port for the refill 30 is provided at an end of the front unit 10 on a side (rear end side) opposite to the pen tip side. Further, an engaging portion 10*eg* that engages (fits) with the rear unit 20 is provided on the rear end side of the front unit 10. A diameter of the engaging portion 10*eg* is smaller than a diameter of a central portion of the front unit 10.

The rear unit 20 is in a shape of a tubular body having an opening 20*ft* in which the engaging portion 10*eg* of the front unit 10 is inserted and engaged. On the other hand, an end of the rear unit 20 located on a side opposite to the opening 20*ft* has a closed shape.

Figure 9A:
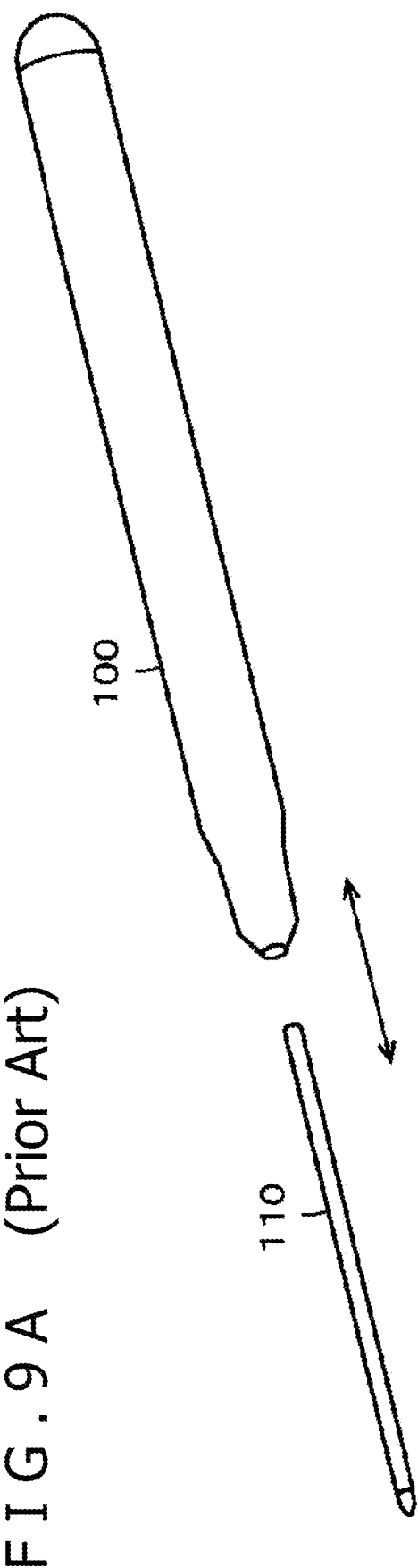
FIGS. 9A and 9B are diagrams for illustrating examples of a conventional electronic pen of which a refill (replacement cartridge) can be replaced.
Figure 9B:
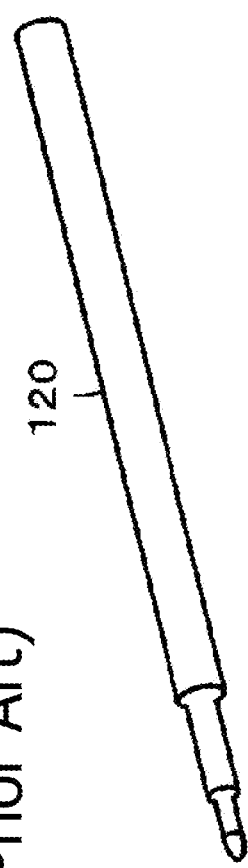

The refill 30 has the core 31 and an ink tank 32. Shapes of the core 31 and the ink tank 32 are tubular. A diameter of the ink tank 32 is larger than a diameter of the core 31. An ink retention volume of the refill 30 is large compared with an ink retention volume of the refill 110 having an ink retaining portion with a diameter similar to a diameter of a core illustrated in FIG. 9A of the conventional example. The refill 30 fulfills a writing function for writing information on a paper medium or the like.

As illustrated by a broken line arrow in FIG. 1B, the electronic pen 1 is configured such that the refill 30 can be inserted into the opening 10*bk* of the front unit 10. Further, as illustrated by another broken line arrow in FIG. 1B, the front unit 10 and the rear unit 20 are configured to be connectable. That is, when the engaging portion 10*eg* located on the rear end side of the front unit 10 is inserted into the opening 20*ft* of the rear unit 20, a side surface of the engaging portion 10*eg* of the front unit 10 and an inner wall of the rear unit 20 on the opening 20*ft* side are engaged with each other. In this state, the front unit 10 and the rear unit 20 are physically and electrically connected, which can be used as the electronic pen 1.

Further, the front unit 10 and the rear unit 20 are configured to be separable. As an example, when the front unit 10 and the rear unit 20 of the electronic pen 1 illustrated in FIG. 1A are held in different hands and pulled while being twisted in different directions from each other, the front unit 10 and the rear unit 20 are separated. Then, a rear end side portion of the refill 30 inserted in the front unit 10 is exposed from the front unit 10. Therefore, as an example, the electronic pen 1 is configured such that a user can pull out the refill 30 from the front unit 10 while holding this exposed portion. The electronic pen 1 fulfills a writing function for writing information on a paper medium or the like by the refill 30 inserted into the front unit 10.

[Configuration Example of Front Unit 10]

Figure 2:
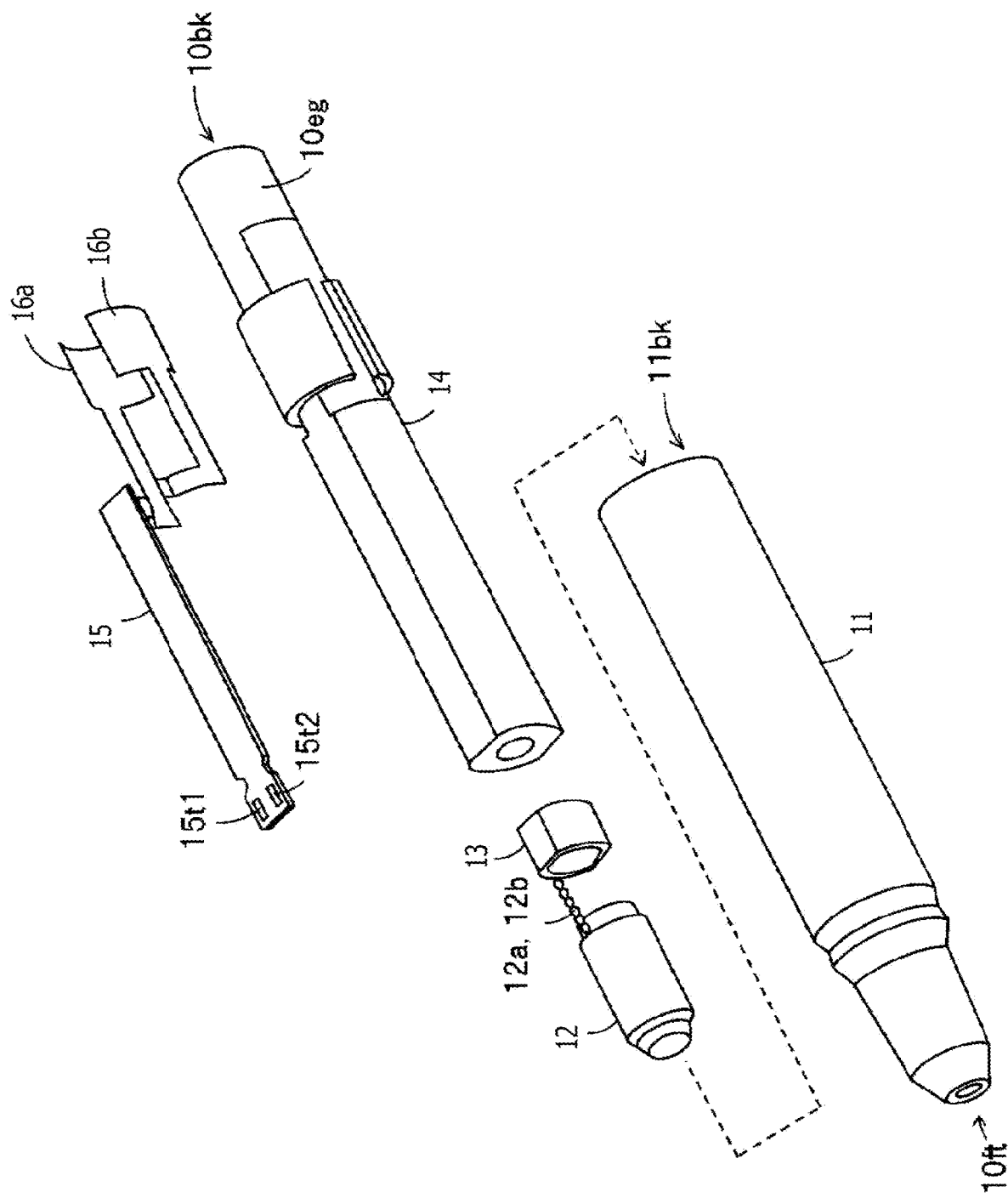
FIG. 2 is an exploded perspective view of a front unit of the electronic pen according to the embodiment of the present disclosure.

FIG. 2 is an exploded perspective view illustrating an example of the configuration of the front unit 10. The front unit 10 includes a front case 11, a coil unit 12, a connecting member 13, a front holder 14, a circuit board 15, and sheet metals (contact portions) 16*a* and 16*b*.

The front case 11 is in a shape of a tubular body having a tapered end on the pen tip side (front end side). The opening 10*ft* through which the core 31 of the refill 30 protrudes is provided at the end on the pen tip side. On the other hand, a storage port 11*bk* is provided on the rear end side.

The coil unit 12 is provided on the pen tip side inside the front case 11. The coil unit 12 is a coil formed by winding a coated conductive wire around a ferrite core of a tubular body for noise suppression. The connecting member 13 in an annular shape is provided at a rear end of the coil unit 12. Further, at a rear end of the connecting member 13, the front holder 14 in a tubular shape for accommodating the ink tank 32 portion of the refill 30 is provided. As described above, the connecting member 13 is provided between the coil unit 12 and the front holder 14 and is used for stably connecting these.

In a state where the coil unit 12, the connecting member 13, and the front holder 14 are connected, a through hole whose center agrees with a line (axis center) connecting centers of both end faces of these is formed. Then, the opening 10*bk*, which is an insertion/extraction port for the refill 30, is provided at a rear side end of the front holder 14.

Further, an upper side surface of the front holder 14 is formed as a flat surface, and the circuit board 15 configured as a PCBA (Printed Circuit Board Assembly) is mounted on this surface as an example. Various circuit components such as a capacitor, a resistor, and an IC (Integrated Circuit) are mounted on the circuit board 15.

Further, the circuit board 15 is provided with connection terminals 15*t*1 and 15*t*2. A coated conductive wire 12*a* extended from one end of the coil of the coil unit 12 is electrically connected to the connection terminal 15*t*1. On the other hand, a coated conductive wire 12*b* extended from another end of the coil of the coil unit 12 is electrically connected to the connection terminal 15*t*2. A resonance circuit is formed by electrically connecting the coil unit 12 and a capacitor mounted on the circuit board 15.

Further, the sheet metals (contact portions) 16*a* and 16*b*, which are metal members, are electrically connected to the circuit board 15. The sheet metals 16*a* and 16*b* are attached to the front holder 14 so as to be fitted into grooves provided on side surfaces of the front holder 14 on the rear end side. The sheet metals 16*a* and 16*b* are each configured such that a wide portion thereof on the rear end side is located at the engaging portion 10*eg*, which is a narrowed portion on the rear end side of the front holder 14.

Then, a module in which the coil unit 12, the connecting member 13, the front holder 14, the circuit board 15, and the sheet metals 16*a* and 16*b* are integrally formed is inserted into the front case 11, thereby forming the front unit 10 illustrated in FIG. 1B. In this case, the rear end portion of the front holder 14 projects from the rear end of the front case 11 to form the engaging portion 10*eg* to be engaged with the rear unit 20.

The front unit 10 and the rear unit 20 are connected to each other by inserting the engaging portion 10*eg* provided on the front unit 10 into the opening 20*ft* provided on the rear unit 20. In this state, the wide portions of the sheet metals 16*a* and 16*b* located at the engaging portion 10*eg* can be electrically connected to sheet metals (contact portions) provided in the rear unit 20 to be described later.

[Configuration Example of Rear Unit 20]

Figure 3:
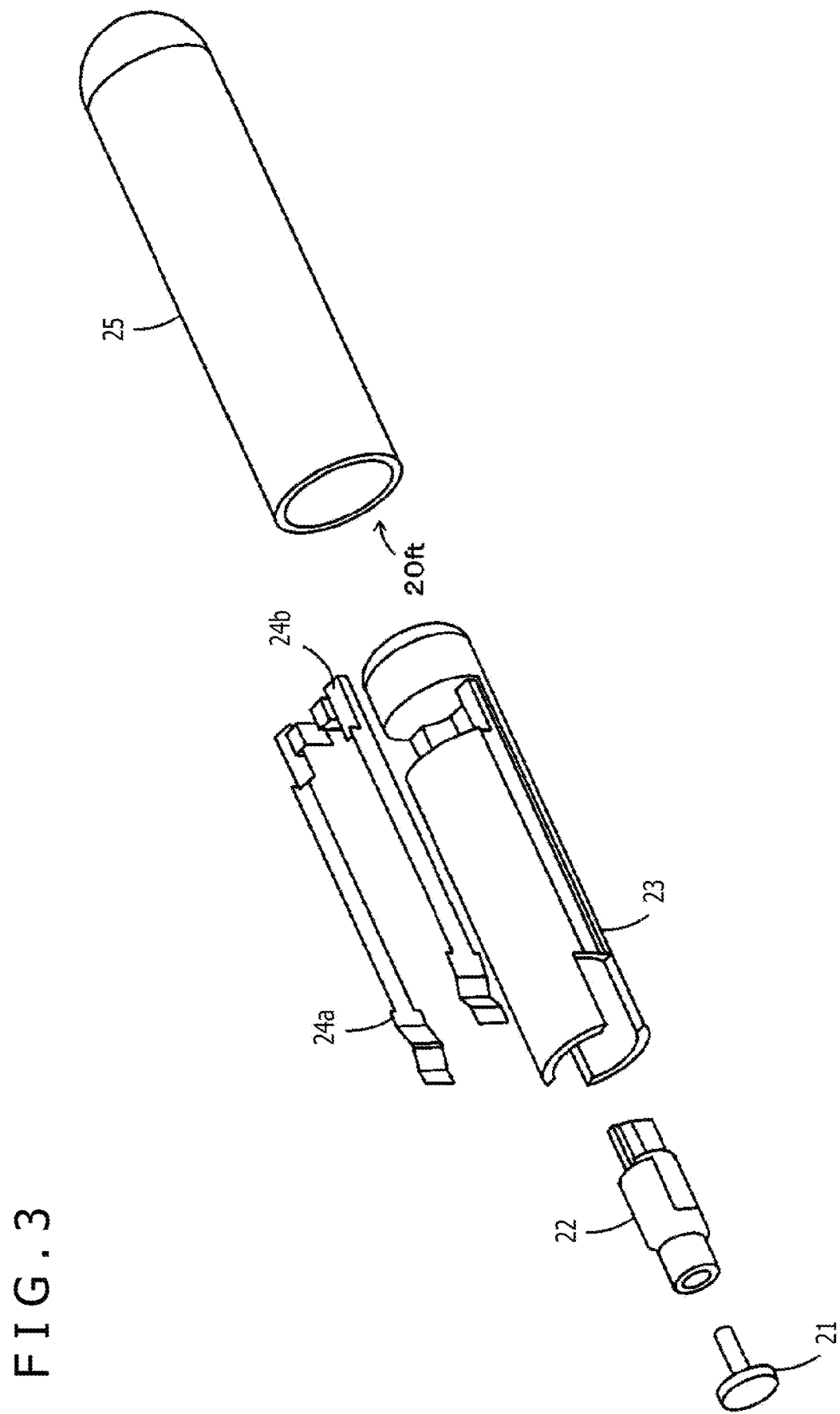
FIG. 3 is an exploded perspective view of a rear unit of the electronic pen according to the embodiment of the present disclosure.

FIG. 3 is an exploded perspective view illustrating an example of the configuration of the rear unit 20 of the electronic pen 1. The rear unit 20 includes a pressing member 21, a writing pressure detector 22, a rear holder 23, sheet metals 24*a* and 24*b*, and a rear case 25. The pressing member 21 comes into contact with the rear end portion of the refill 30 inserted into the front unit 10 in a state where the front unit 10 and the rear unit 20 are connected to each other. Therefore, the pressing member 21 transmits a writing pressure applied to a tip end of the core 31 of the refill 30 to the writing pressure detector 22.

The writing pressure detector 22 is configured by a variable-capacitance capacitor. That is, a first electrode is attached to one surface of a plate-shaped dielectric having a predetermined thickness, and a second electrode is provided on another surface opposite to the one surface with a predetermined gap provided therebetween, for example, by using a spacer. Regarding this second electrode, the refill 30 that is in contact with the pressing member 21 moves in an axial direction according to the writing pressure applied to the tip of the core 31. As a result, a capacitance between the first electrode and the second electrode on both sides of the dielectric changes according to the writing pressure, and the writing pressure can be detected according to the changing capacitance.

The rear holder 23 houses the writing pressure detector 22, and the rear holder 23 containing the writing pressure detector 22 is incorporated in the rear unit 20, so that the position of the writing pressure detector 22 is fixed in the rear unit 20. A portion of the sheet metal 24*a* on the front end side is connected to the first electrode of the writing pressure detector 22. On the other hand, a portion of the sheet metal 24*b* on the front end side is connected to the second electrode of the writing pressure detector 22. A rear end side portion of the sheet metal 24*a* and a rear end side portion of the sheet metal 24*b* are attached to the rear holder 23 so as to be fitted into grooves provided on side surfaces of the rear holder 23. Ends of the sheet metals 24*a* and 24*b* on the front end side each have a structure in which the sheet metal 24*a* or 24*b* is bent into a mountain shape such that an apex is located inside the rear holder 23.

Then, the writing pressure detector 22 to which the pressing member 21 is attached is housed in the rear holder 23 to which the sheet metals 24*a* and 24*b* are attached. As a result, the first electrode of the writing pressure detector 22 is electrically connected to the sheet metal 24*a*, and the second electrode of the writing pressure detector 22 is connected to the sheet metal 24*b*. A module in which the pressing member 21, the writing pressure detector 22, the rear holder 23, and the sheet metals 24*a* and 24*b* are integrally formed is housed in the rear case 25 to form the rear unit 20 illustrated in FIG. 1B.

By inserting the engaging portion 10*eg* provided in the front unit 10 into the opening 20*ft* provided in the rear unit 20, the sheet metals 16*a* and 16*b* located at the engaging portion 10*eg* are electrically connected to the apex portions bent into a mountain shape of the sheet metals 24*a* and 24*b* provided in the rear unit 20. That is, the circuit board 15 provided in the front unit 10 and the writing pressure detector 22 provided in the rear unit 20 are electrically connected.

As described above, the circuit board 15 is connected to the coil unit 12. Therefore, since the resonance circuit is formed by connecting the coil unit 12, the capacitor of the circuit board 15, and the writing pressure detector 22 configured by a variable-capacitance capacitor, the electronic pen 1 functions as an electromagnetic induction type electronic pen that has a function for indicating a position to a position detecting device. A current flows through the coil unit 12 of the electronic pen 1 according to a magnetic field generated by the position detecting device, and the electronic pen 1 generates a signal. The electronic pen 1 is configured to transmit a signal including writing pressure information to the position detecting device.

[Configuration of Connection Body of Front Unit 10 and Rear Unit 20]

Next, an example of the structure of the electronic pen 1 configured by connecting the front unit 10 described with reference to FIG. 2 and the rear unit 20 described with reference to FIG. 3 will be described with reference to FIGS. 4A and 4B. FIG. 4A is an external view of the electronic pen 1 when the front case 11 and the rear case 25 are removed. FIG. 4B is a cross-sectional view of the electronic pen 1 including the front case 11 and the rear case 25.

As illustrated in FIG. 4A, the coil unit 12, the connecting member 13, and the front holder 14 to which the circuit board 15 and the sheet metals 16*a* and 16*b* are attached are connected in series inside the electronic pen 1. The refill 30 is inserted into through holes whose center agrees with axial centers of these components, and the tip of the core 31 protrudes from the coil unit 12. Further, circuit components such as a capacitor 15*a*, a resistor, and a control IC are mounted on the circuit board 15.

Then, the engaging portion 10*eg* of the front holder 14 is inserted into the opening 20*ft* of the rear unit 20 and engages with the rear holder 23 of the rear unit 20 as illustrated in FIG. 4A. As described with reference to FIG. 3, the writing pressure detector 22 is provided inside the rear holder 23, and first and second terminals of the writing pressure detector 22 are electrically connected to the sheet metals 24*a* and 24*b* attached to the rear holder 23. Therefore, the sheet metals 16*a* and 16*b* attached to the front holder 14 and the sheet metals 24a and 24b attached to the rear holder 23 are electrically connected when the engaging portion 10eg of the front holder 14 engages with the rear holder 23 of the rear unit 20.

FIG. 4A illustrates a connecting portion between the sheet metal 16b and the sheet metal 24b located on the near side. That is, the portion bent into the mountain shape of the sheet metal 24b is located above the wide portion of the sheet metal 16b, and the wide portion of the sheet metal 16b and the apex portion of the portion bent into the mountain shape of the sheet metal 24b come into contact with each other to be electrically connected. Incidentally, a connecting portion between the sheet metal 16a and the sheet metal 24a has a similar electrical connecting configuration to the connecting portion between the sheet metal 16b and the sheet metal 24b.

When the front unit 10 and the rear unit 20 are connected in this way, the coil unit 12, the capacitor 15a of the circuit board 15, and the writing pressure detector 22 are electrically connected in parallel to form a resonance circuit.

Further, as illustrated in FIG. 4B, in a state where the front unit 10 into which the refill 30 has been inserted is engaged with the rear unit 20, the core 31 of the refill 30 passes through the through hole of the coil unit 12, and the tip portion of the core 31 protrudes from the opening 10ft of the front unit 10. Further, in this state, a rear end of the ink tank 32 of the refill 30 is located in the rear unit 20 and comes into contact with the pressing member 21.

The pressing member 21 is attached to the writing pressure detector 22, and is capable of pressing the second electrode of the writing pressure detector 22 toward the dielectric side and capable of releasing the pressing. Further, the refill 30 is also configured to be capable of moving in and moving out, namely, what is generally called sliding movement, by a predetermined length in the axial direction (longitudinal direction of the electronic pen 1) inside the electronic pen 1. Therefore, the writing pressure applied to the tip (pen tip) of the core 31 of the refill 30 is transmitted to the pressing member 21 through the refill 30, and is transmitted to the writing pressure detector 22 via the pressing member 21. As a result, the writing pressure detector 22 can detect the writing pressure as a change in capacitance between the electrodes on both sides of the dielectric.

Then, since the coil unit 12, the circuit board 15, the writing pressure detector 22, and the resonance circuit are formed, upon reception of the magnetic field (signal) supplied from the position detecting device, a magnetic field (signal) corresponding to this can be generated and transmitted to the position detecting device with the writing pressure information included therein. That is, the electronic pen 1 can function as an electromagnetic induction type electronic pen. At the same time, since the refill 30 is mounted inside, the electronic pen 1 can also function as a writing tool for writing on a paper medium or the like.

[Equivalent Circuit of Electronic Pen 1]

Figure 5:
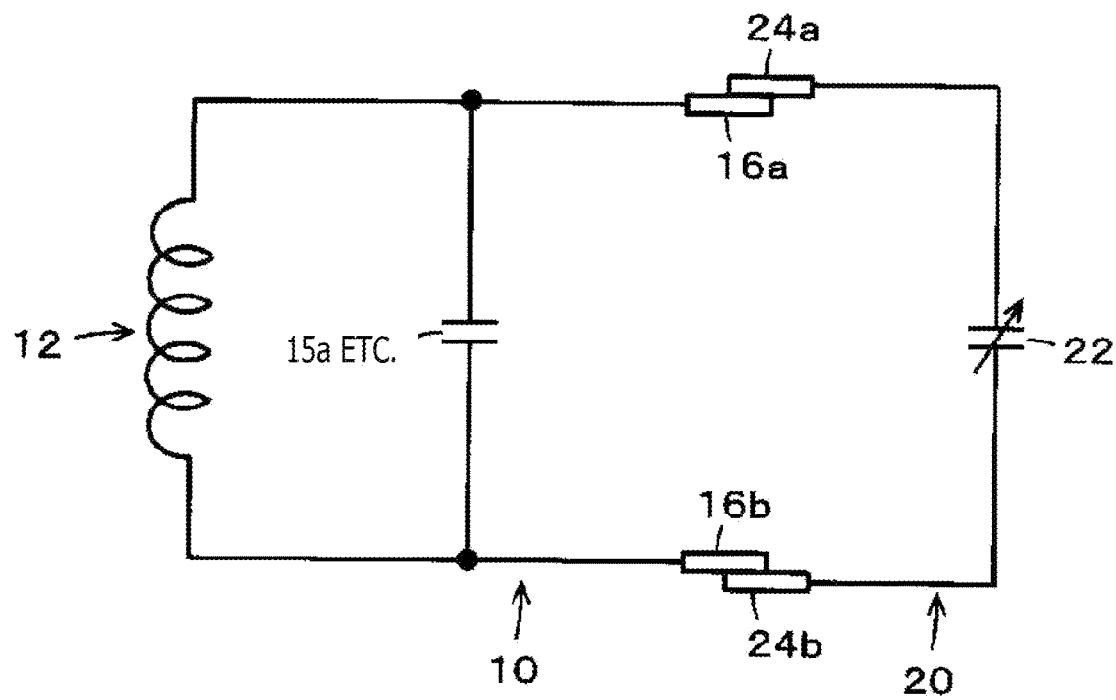
FIG. 5 is a diagram illustrating an equivalent circuit of the electronic pen according to the embodiment of the present disclosure.

FIG. 5 illustrates an equivalent circuit of the electronic pen 1 according to the embodiment. As described above, the front unit 10 is provided with the coil unit 12 and the circuit board 15 on which the capacitor 15a and the like are mounted, and these are electrically connected to each other. Further, the rear unit 20 is equipped with the writing pressure detector 22. Then, when the engaging portion 10eg of the front unit 10 is inserted into the opening 20ft of the rear unit 20, the sheet metals 16a and 16b on the front unit 10 side and the sheet metals 24a and 24b of the rear unit 20 are automatically connected.

As a result, as illustrated in FIG. 5, the coil unit 12, the capacitor 15a and the like, and the writing pressure detector 22 are connected in parallel to form a resonance circuit. Now, it is assumed that the electronic pen 1 receives the magnetic field (signal) from the position detecting device. In this case, the resonance circuit of the electronic pen 1 generates a signal corresponding to the received magnetic field, and this signal can be transmitted to the position detecting device with information indicating a writing pressure detection result by the writing pressure detector 22 included in the signal. That is, the electromagnetic induction type electronic pen 1 can be achieved.

However, in the case of the electronic pen 1 described above, even when the front unit 10 and the rear unit 20 are separated, the electrical connection between the coil unit 12 and the capacitor 15a and the like of the circuit board 15 is not interrupted. Accordingly, the electronic pen 1 may function as an electronic pen in an incomplete state in which the writing pressure is not detected. Therefore, the circuit board 15 may be provided on the rear unit 20 side. In the case where the circuit board 15 is provided on the rear unit 20 side, when the front unit 10 and the rear unit 20 are separated, since the coil unit 12 can be separated from the capacitor 15a and the like of the circuit board 15, and also from the writing pressure detector 22, a resonance circuit cannot be formed.

Figure 6:
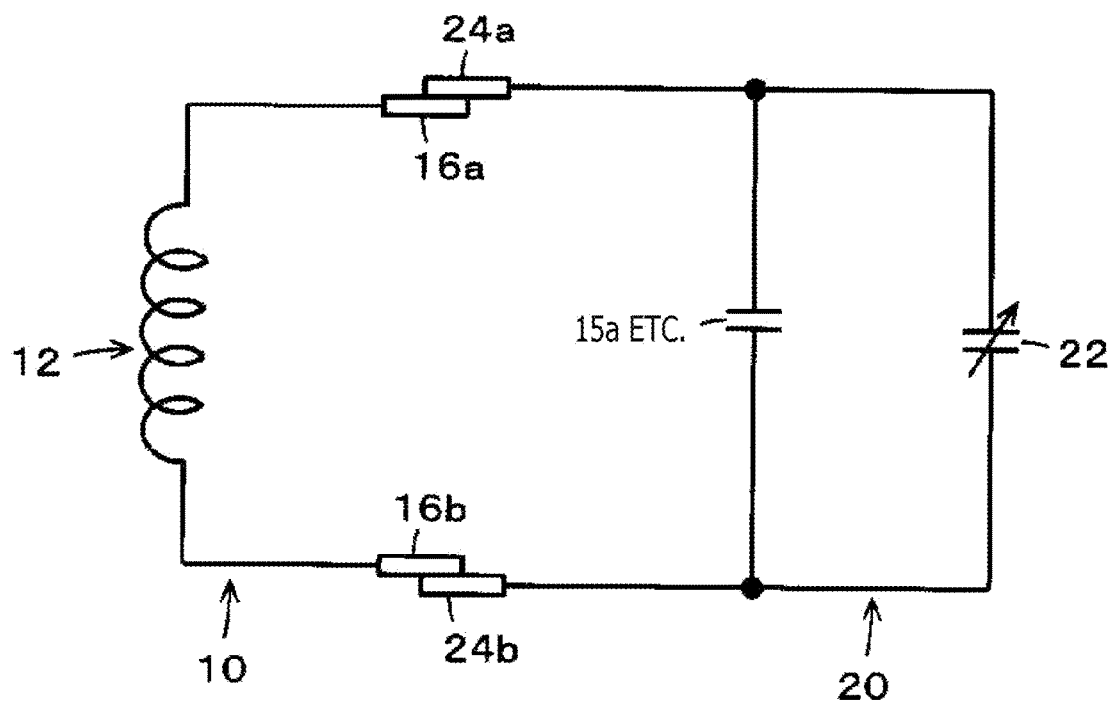
FIG. 6 is a diagram illustrating another example of an equivalent circuit of the electronic pen according to the embodiment of the present disclosure.

FIG. 6 is a diagram illustrating another example of the equivalent circuit of the electronic pen 1 according to the embodiment. In the case of another example, the circuit board 15 is provided on the rear unit 20 side. As illustrated in FIG. 6, on the front unit 10 side where the sheet metals 16a and 16b are provided, only the coil unit 12 exists as a component for the resonance circuit. On the other hand, on the rear unit 20 side, the capacitor 15a and the like mounted on the circuit board 15 and the writing pressure detector 22 are mounted.

Therefore, when the front unit 10 and the rear unit 20 are engaged with each other, the sheet metals 16a and 16b on the front unit 10 side and the sheet metals 24a and 24b of the rear unit 20 are automatically connected. In this case, as illustrated in FIG. 6, the coil unit 12, the capacitor 15a and the like, and the writing pressure detector 22 are connected to form a resonance circuit, which makes the electronic pen 1 effectively function as an electromagnetic induction type electronic pen. However, when the front unit 10 and the rear unit 20 are separated, the connection between the sheet metals 16a and 16b on the front unit 10 side and the sheet metals 24a and 24b of the rear unit 20 is also released.

In this case, the coil unit 12 is disconnected from the capacitor 15a and the like and the writing pressure detector 22. In this case, since the resonance circuit is not formed, the electronic pen 1 is disabled from functioning as an electromagnetic induction type electronic pen. Therefore, the electronic pen 1 can be prevented from functioning as an electronic pen in an incomplete state in which the writing pressure is not detected.

Figure 7A:
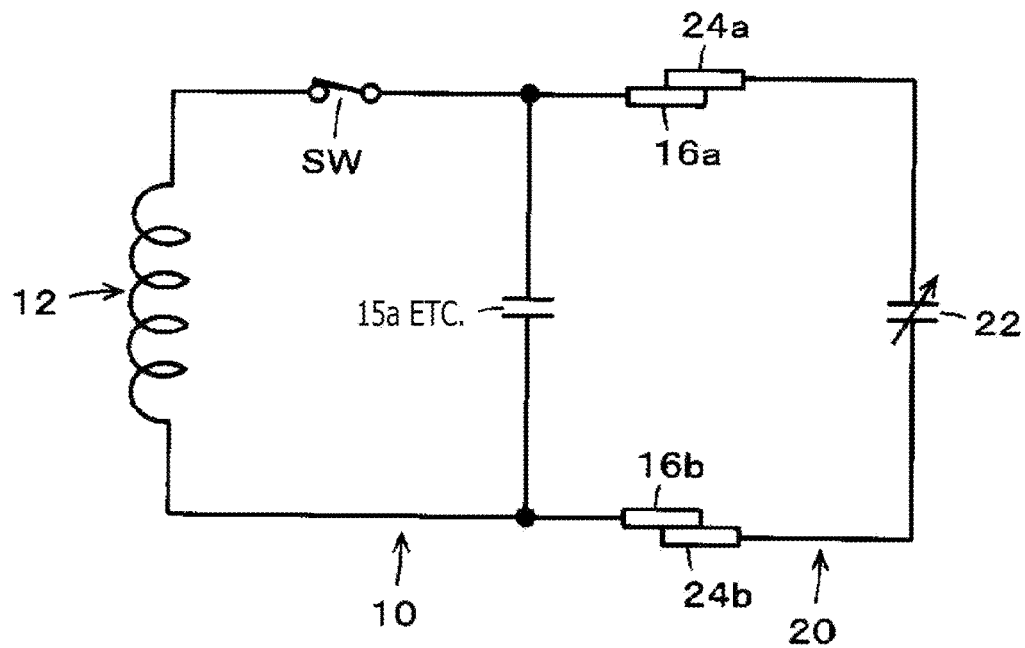
FIGS. 7A and 7B are diagrams illustrating another example of the equivalent circuit of the electronic pen according to the embodiment of the present disclosure.
Figure 7B:
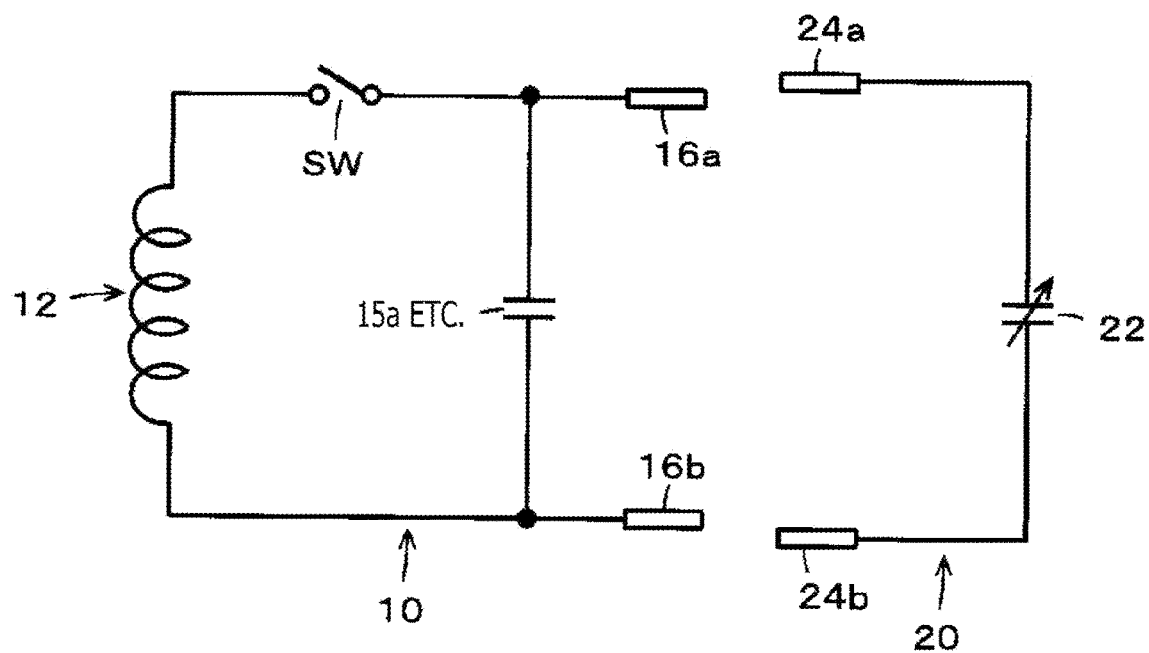

Due to the size relation between the front unit 10 and the rear unit 20, even if the size of the circuit board 15 is adjusted, the case where the circuit board 15 cannot be mounted on the rear unit 20 can be considered. In such a case, an effect similar to the case of the equivalent circuit illustrated in FIG. 6 can be obtained while the circuit board 15 is mounted on the front unit 10. FIGS. 7A and 7B are diagrams illustrating another example of the equivalent circuit of the electronic pen 1 and, in this example, an effect similar to the case of the equivalent circuit illustrated in FIG. 6 can be obtained while the circuit board 15 is mounted on the front unit 10.

That is, as can be seen by comparing FIGS. 7A and 7B, and FIG. 5, in each case, the coil unit 12 and the circuit board 15 having the capacitor 15a and the like are mounted on the front unit 10 side including the sheet metals 16a and 16b. Then in either case, the writing pressure detector 22 is mounted on the rear unit 20 side including the sheet metals 24a and 24b. The difference is that a switch SW is provided between the coil unit 12 and the capacitor 15a and the like on the front unit 10 side.

The switch SW is controlled so as to be in an on state as illustrated in FIG. 7A when the sheet metals 16a and 16b on the front unit 10 side and the sheet metals 24a and 24b on the rear unit 20 side are connected. Further, the switch SW is controlled to be turned off as illustrated in FIG. 7A when the sheet metals 16a and 16b on the front unit 10 side and the sheet metals 24a and 24b on the rear unit 20 side are not connected.

Therefore, when the sheet metals 16a and 16b on the front unit 10 side and the sheet metals 24a and 24b on the rear unit 20 side are connected, the switch SW is turned on. In this case, as illustrated in FIG. 7A, the coil unit 12, the capacitor 15a and the like, and the writing pressure detector 22 are connected to form a resonance circuit, so that the electronic pen 1 functions as an electromagnetic induction type electronic pen.

On the other hand, when the sheet metals 16a and 16b on the front unit 10 side and the sheet metals 24a and 24b on the rear unit 20 side are disconnected, the switch SW is turned off. In this case, as illustrated in FIG. 7B, since the coil unit 12, the capacitor 15a and the like, and the writing pressure detector 22 are not connected, the resonance circuit is not formed, and the electronic pen 1 is prevented from functioning as an electromagnetic induction type electronic pen.

As described above, in the case of the electronic pen 1 according to the present embodiment, when the front unit 10 and the rear unit 20 are separated, by preventing the coil unit 12 from being connected to the capacitor 15a and the like and the writing pressure detector 22, the resonance circuit can be prevented from being formed. As a result, the electronic pen 1 can be prevented from functioning as an electromagnetic induction type electronic pen in an incomplete state where the writing pressure detector 22 is not included in the resonance circuit. Note that the switch SW may be what is generally called a mechanical switch that mechanically switches on/off, or may be a switch that electrically switches on/off.

[Structural Improvement of Electronic Pen]

FIGS. 8A to 8C are diagrams for illustrating modification examples of the electronic pen 1. FIG. 8A is a cross-sectional view same as the cross-sectional view of the electronic pen 1 illustrated in FIG. 4B. In the case of the electronic pen 1 of the above-described embodiment, when the refill 30 is inserted into the front unit 10, there may be a gap (space) between the front holder 14 and the ink tank 32 of the refill 30 in a part of the front holder 14 on the pen tip side, structurally. If this gap remains, the refill 30 may rattle in the axial direction, which is not preferable.

Therefore, as illustrated in FIG. 8B, a spring SP is provided in the gap portion, so that the front holder 14 and the refill 30 always apply a predetermined pressure to each other in opposite directions. As a result, rattling in the axial direction of the refill 30 can be prevented. Further, the writing pressure applied to the core 31 of the refill 30 can appropriately be transmitted to the writing pressure detector 22. Note that, in FIG. 8B, since there is no significant difference in configuration from the electronic pen 1 illustrated in FIG. 4B other than the portion provided with the spring SP, the reference symbols of the parts that are configured in the same manner are omitted.

Further, as illustrated in FIG. 8C, a pressing member 21A provided for the writing pressure detector 22 has a shape of a cap such that the rear end of the refill 30 can be fitted into the cap as illustrated in the pressing member 21A, and the refill 30 can be attached to the pressing member 21A by being pushed therein. As a result, rattling in the axial direction of the refill 30 can be prevented. Further, the writing pressure applied to the core 31 of the refill 30 can appropriately be transmitted to the writing pressure detector 22. In addition, also in FIG. 8C, since there is no significant difference in configuration from the electronic pen 1 illustrated in FIG. 4B other than the pressing member 21A, the reference symbols of the parts that are configured in the same manner are omitted.

[Effects of Embodiment]

In the case of the electronic pen 1 according to the above-described embodiment, an electronic pen allowing the refill 30 with the large the ink tank for a ballpoint pen to be inserted in and removed from the electronic pen can be achieved by adopting the configuration separable into two parts, that are the front unit 10 and the rear unit 20. In other words, an electronic pen that can be used with the replaceable refill 30 with a large ink tank for a ballpoint pen can be achieved. The electronic pen 1 can fulfill both a position indicating function for the position detecting device and a writing function for writing on a paper medium or the like.

Further, in the electronic pen 1 of the above-described embodiment, when the two parts that are the front unit 10 and the rear unit 20 are connected, the coil unit 12 provided in the front unit 10 and the writing pressure detector 22 provided in the rear unit 20 can be connected to form a resonance circuit. Then, only when the resonance circuit can be configured, the electronic pen 1 can function as an electromagnetic induction type electronic pen.

Still further, the electronic pen 1 of the above-described embodiment can also be configured so as to form a resonance circuit including the coil unit 12 only when the two portions that are the front unit 10 and the rear unit 20 are connected. Therefore, the electronic pen 1 can be prevented from functioning as an electronic pen in an incomplete state in which the writing pressure detector 22 is not connected.

[Modification Example]

It should be noted that, in the case of the electronic pen 1 described above, when the front unit 10 and the rear unit 20 are engaged with each other with the refill 30 not having been inserted into the front unit 10, the coil unit 12, the capacitor 15a and the like, and the writing pressure detector 22 are connected to form a resonance circuit. However, when the refill 30 has not been inserted, the writing pressure cannot be detected, and the electronic pen 1 functions as an electronic pen in an incomplete state.

Accordingly, a switch may be provided such that, only when the front unit 10 and the rear unit 20 are engaged with each other with the refill 30 having been inserted, the coil unit 12 is connected to the circuit portion including the writing pressure detector 22 to form a resonance circuit. Simply, in the configuration described with reference to FIGS. 7A and 7B, it is sufficient if the switch SW can be turned on only when the front unit 10 and the rear unit 20 are engaged with each other with the refill 30 having been inserted. This makes it possible to configure an electronic pen that functions only when the front unit 10 and the rear unit 20 are engaged with each other with the refill 30 having been inserted.

Further, in the above-described embodiment, the resonance circuit includes the capacitor 15*a* and the like mounted on the circuit board 15 in addition to the coil unit 12 and the writing pressure detector 22, but what is included is not limited thereto. It is sufficient if there are the coil unit 12 and the writing pressure detector 22 for the minimum configuration of the resonance circuit. Therefore, as the resonance circuit configured in the electronic pen 1, various configurations including at least the coil unit 12 and the writing pressure detector 22 can be mounted on the electronic pen 1.

DESCRIPTION OF REFERENCE SYMBOLS

1 . . . Electronic pen
10 . . . Front unit
10*ft* . . . First opening
10*eg* . . . Engaging portion
10*bk* . . . Second opening
11 . . . Front case
11*bk* . . . Storage port
12 . . . Coil unit
12*a*, 12*b* . . . Coated conductive wire
13 . . . Connecting member
14 . . . Front holder
15 . . . Circuit board
15*a* . . . Capacitor
15*t*1, 15*t*2 . . . Connection terminal
16*a*, 16*b* . . . Sheet metal (contact portion)
20 . . . Rear unit
20*ft* . . . Third opening
21 . . . Pressing member
22 . . . Writing pressure detector
23 . . . Rear holder
24*a*, 24*b* . . . Sheet metal (contact portion)
25 . . . Rear case
30 . . . Refill
31 . . . Core
32 . . . Ink tank
SP . . . Spring
21A . . . Pressing member

The invention claimed is:

1. A position indicator comprising:
a first housing having a first opening portion at a first end of the first housing where a pen tip of a component having a writing function is located and a second opening portion at a second end of the first housing for inserting and removing the component having the writing function;
a coil located inside the first housing and on a side of the first housing closer to the first opening portion than the second opening portion;
a second housing having a third opening portion that engages with the second opening portion of the first housing;
a writing pressure detector that is located inside the second housing and that, in operation, detects a writing pressure applied to the pen tip of the component having the writing function;
a resonance circuit including a circuit in which the coil and the writing pressure detector are electrically connected in a state where the second opening portion of the first housing and the third opening portion of the second housing are engaged with each other;
a first terminal member located inside the first housing and electrically connected to the coil; and
a second terminal member located inside the second housing and electrically connected to the writing pressure detector,
wherein the first terminal member and the second terminal member are electrically connected in the state where the second opening portion of the first housing and the third opening portion of the second housing are engaged with each other, and
wherein the first terminal member and the second terminal member are electrically disconnected in a state where the second opening portion of the first housing and the third opening portion of the second housing are separated from each other.

2. The position indicator according to claim 1, wherein the coil and the writing pressure detector are not electrically connected in the state where the second opening portion of the first housing and the third opening portion of the second housing are separated from each other.

3. The position indicator according to claim 1, wherein:
part of the first terminal member is located on an outer surface of the second opening portion of the first housing, and part of the second terminal member is located on an inner surface of the third opening portion of the second housing.

4. The position indicator according to claim 1, further comprising:
a circuit board located inside the first housing and electrically connected to the coil and the first terminal member.

5. The position indicator according to claim 1, further comprising:
a holder located inside the first housing and storing the component having the writing function,
wherein the second opening portion of the first housing is formed at an end of the holder located on a side of the holder opposite to a side of the holder adjacent to a position of the pen tip of the component having the writing function.

6. The position indicator according to claim 5, further comprising:
a first terminal member located inside the first housing and electrically connected to the coil,
wherein a part of the first terminal member is located on an outer surface of the second opening portion of the first housing.

7. The position indicator according to claim 1, wherein:
the component having the writing function includes an ink retaining portion for retaining ink and a core having the pen tip.

8. The position indicator according to claim 7, further comprising:
a holder that is located inside the first housing and stores the ink retaining portion,
wherein the core is located in a state of penetrating through a through hole of the coil fixed to the holder.

9. The position indicator according to claim 1, further comprising:
a pressing member that is provided between the component having the writing function located inside the first housing and the writing pressure detector located inside the second housing and that transmits a writing pressure applied to the component having the writing function to the writing pressure detector in the state where the second opening portion of the first housing and the third opening portion of the second housing are engaged with each other.

10. The position indicator according to claim 1, further comprising:
a first holder in which the writing pressure detector is located,
wherein the first terminal member includes a first terminal and a second terminal,
wherein a first side surface of the first holder includes a first groove in which the first terminal of the first terminal member is located, and
wherein a second side surface of the first holder includes a second groove in which the second terminal of the first terminal member is located.

11. The position indicator according to claim 10, wherein each of the first and second terminals of the first terminal member includes a bent portion partially located inside of the first holder.

12. The position indicator according to claim 10, further comprising:
a second holder in which the component having the writing function is located,
wherein the second terminal member includes a first terminal and a second terminal,
wherein a first side surface of the second holder includes a first groove in which the first terminal of the second terminal member is located, and
wherein a second side surface of the second holder includes a second groove in which the second terminal of the second terminal member is located.

13. The position indicator according to claim 12, wherein each of the first and second terminals of the second terminal member includes a bent portion.

* * * * *